United States Patent [19]
Forsten

[11] 3,842,598
[45] Oct. 22, 1974

[54] ROCKET POWER PLANT

[75] Inventor: Irving Forsten, West Orange, N.J.

[73] Assignee: The United States of America as represented by the Secretary of the Army, Washington, D.C.

[22] Filed: Nov. 9, 1966

[21] Appl. No.: 594,313

[52] U.S. Cl................ 60/259, 60/39.48, 60/200, 102/49.8
[51] Int. Cl.............................. F02k 9/02
[58] Field of Search... 149/109; 60/200, 211, 39.48, 60/217, 258, 259; 102/57, 49.8

[56] References Cited
UNITED STATES PATENTS

| | | | |
|---|---|---|---|
| 950,032 | 2/1910 | Stiriz | 102/57 |
| 2,419,866 | 4/1947 | Wilson | 60/253 |
| 2,874,539 | 2/1959 | Fox | 60/211 X |
| 2,902,822 | 9/1959 | Mckiernan | 222/136 |
| 2,974,475 | 3/1961 | Kolfenbach et al. | 149/109 X |
| 3,010,279 | 11/1961 | Mullen et al. | 60/218 |
| 3,143,445 | 8/1964 | Hebenstreit | 149/109 X |
| 3,181,937 | 5/1965 | Cox | 149/109 X |
| 3,212,254 | 10/1965 | Fox | 60/217 |
| 3,278,351 | 10/1966 | Null et al. | 149/109 X |
| 3,328,964 | 4/1967 | Williams et al. | 60/39.48 |

Primary Examiner—Samuel Feinberg
Attorney, Agent, or Firm—Eugene E. Stevens

[57] ABSTRACT

A rocket assembly having a prepackaged power plant encompassed therein comprising: a pressurizing source, a flexible oxidizer container positioned within a fuel tank, a thrust chamber, and means connecting said components. On activation of the rocket, the oxidizer container bursts thereby mixing the oxidizer with the fuel whereupon the propellant is fed to the thrust chamber for propulsion of the rocket.

3 Claims, 1 Drawing Figure

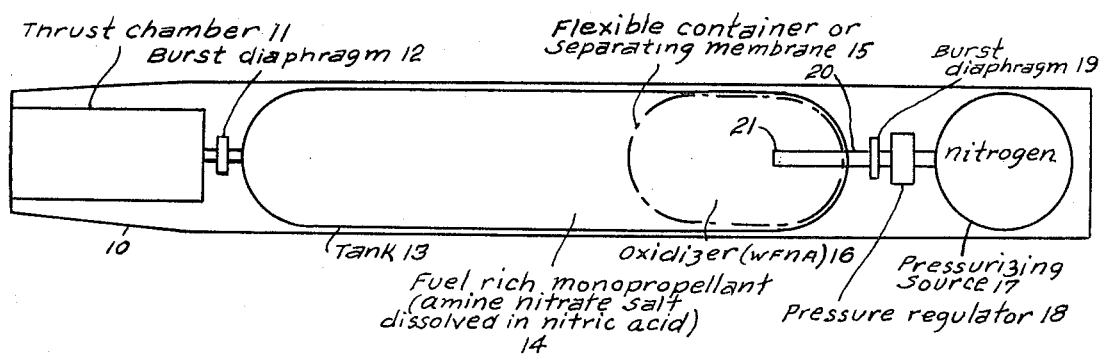

ROCKET POWER PLANT

The invention described herein may be manufactured and used by or for the Government, for governmental purposes, without the payment to me of any royalty thereon.

This invention relates to a rocket with a prepackaged power plant utilizing a liquid propellant.

The object of this invention is to provide a unit power plant having a liquid monopropellant of reduced sensitivity for extended storage and safety and with the capability of activating the system to change the monopropellant to a fuel of high energy level.

It is contemplated that for the utilization of a liquid propellant for artillery rockets that the unit may be a prepackaged unit using storable fuels and oxidizers in connection with a variable thrust rocket engine.

One form of such a device is shown in the drawing which is a diagrammatic illustration of the prepackaged unit in which the rocket 10 has in the rear a thrust chamber 11 connected through a burst diaphragm 12 to a fuel tank 13 containing a monopropellant 14, such as an amine nitrate salt. Within the tank 13 is a flexible bag 15 containing an oxidizer 16 that is compatible with the monopropellant, such as nitric acid. The flexible bag 15 should be made of a self-sealing material so that even if the bag were punctured by gunfire, the premature mixing of the fuels would be prevented. The pressure activating means of this packaged unit is a sphere 16 containing nitrogen under pressure and this sphere is connected through a pressure regulator 18, a burst diaphragm 19 by the connection 20 to the outlet 21 to introduce the pressurized gas into the interior of the flexible bag 15.

In operation, the pressurized packaged power plant is activated in any conventional manner (not shown) wherein the pressurizing source 17 containing in this specific application nitrogen, passes through the pressure regulator 18 and bursts the diaphragm 19 to be injected directly into the flexible bag 15 containing an oxidizer compatible with the monopropellant such as nitric acid; the pressure in the flexible bag is quickly built up to a point sufficient to burst the bag and mix the oxidizer by gravitation with the monopropellant 14 which in this case is an amine nitrate salt. The increasing pressure in the tank 13 continues to build up the pressure until the burst diaphragm 12 is opened and the propellant is thereafter fed to the thrust chamber 11 for normal propulsion of the rocket 10. The mixing within the tank 13 may be assisted by longitudinal vanes (not shown) which are rotated by the spin attained by the rocket in flight. Thus, the monopropellant is maintained at a low energy level until mixed with the oxidizer to become a high energy propellant. The flexible bag being of a self-sealing material will prevent accidental mixing of the oxidizer and monopropellant even if the bag is punctured by gunfire.

The unit heretofore described provides a variable thrust liquid rocket power plant and has advantages in the form of guidance and control, performance, simplified launch procedures and propellant availability for ordnance artillery weapons.

What is claimed is:

1. A rocket assembly having a prepackaged power plant encompassed therein comprising: pressure activating means comprising a gas, connecting means extending laterally thereof to a flexible container constructed of a self-sealing material and having an oxidizer positioned therein, a pressure regulation and burst diaphragm positioned on said means between the pressure activating means and the flexible container, said flexible container positioned within the fuel tank means, said fuel tank means having a monopropellant positioned therein, additional connecting means extending laterally from said tank to a thrust chamber, a second burst diaphragm positioned on said additional connection means between the tank and thrust chamber, whereupon activation of the prepackaged power plant, gas passes through the pressure regulator and burst diaphragm into the flexible container, whereby the increased pressure therein burst said container and mixes the oxidizer by gravitation with the monopropellant, whereby the resultant increased pressure in the fuel tank opens the second burst diaphragm and the propellant is thereafter fed to the thrust chamber for propulsion of the rocket.

2. A rocket assembly in accordance with claim 1 wherein nitrogen is utilized within the pressurizing source.

3. A rocket assembly in accordance with claim 1 wherein the oxidizer is white fuming nitric acid and the monopropellant is an amine nitrate salt.

* * * * *